United States Patent [19]

Day et al.

[11] Patent Number: 5,104,540
[45] Date of Patent: Apr. 14, 1992

[54] COATED MOLTEN METAL FILTERS

[75] Inventors: J. Paul Day, Big Flats; Timothy V. Johnson, Corning; Ronald D. Quinn, Painted Post, all of N.Y.

[73] Assignee: Corning Incorporated, Corning, N.Y.

[21] Appl. No.: 542,725

[22] Filed: Jun. 22, 1990

[51] Int. Cl.$^5$ .................. C22B 15/00; B22C 9/08; B01D 39/20; B22B 9/00
[52] U.S. Cl. .................. 210/510.1; 75/568; 164/134; 164/358; 266/230; 266/227; 428/408; 428/116; 428/318.4; 428/457
[58] Field of Search ............ 428/408, 116, 457, 318.4; 75/568, 407, 561; 266/227, 230, 45; 264/59, 60; 210/496, 510.1, 639, 500.26; 164/55.1, 57.1, 58.1, 59.1, 134, 358

[56] References Cited

U.S. PATENT DOCUMENTS

| 1,596,888 | 8/1926 | Pacz | 75/568 |
|---|---|---|---|
| 4,152,141 | 5/1979 | Steinegger | 75/68 R |
| 4,329,162 | 5/1982 | Pitcher, Jr. | 210/510.1 |
| 4,591,383 | 5/1986 | McGarry et al. | 210/510.1 |
| 4,610,832 | 9/1986 | Brockmeyer | 210/510.1 |
| 4,681,624 | 7/1987 | DeAngelis et al. | 164/134 |
| 4,690,196 | 9/1987 | Vernay | 164/358 |
| 4,708,740 | 11/1987 | Tungatt et al. | 266/227 |
| 4,713,180 | 12/1987 | Hofmann et al. | 210/510.1 |
| 4,802,527 | 2/1989 | Brockmeyer et al. | 210/510.1 |
| 4,946,592 | 8/1990 | Galaj et al. | 210/500.26 |
| 5,022,991 | 6/1991 | Day et al. | 210/510.1 |
| 5,033,531 | 7/1991 | Fisher et al. | 210/496 |

FOREIGN PATENT DOCUMENTS

| 56-060618 | 9/1981 | Japan . | |
|---|---|---|---|
| 61-216840 | 9/1986 | Japan | 164/57.1 |
| 62-021458 | 1/1987 | Japan | 164/134 |

Primary Examiner—Ellis P. Robinson
Assistant Examiner—Frank Rosenberg
Attorney, Agent, or Firm—L. Rita Quatrini; Richard N. Wardell

[57] ABSTRACT

A molten metal filter is disclosed having a carbon or carbon-thermite coating that reduces thermal shock to the filter, and protects the filter from corrosion from the metal or components and impurities in the metal, and prevents metal from freezing in the filter. A molten metal assembly suitable for casting molten metal is disclosed which comprises a filter for molten metal and means for molten metal flow passage leading through the filter. The means have surfaces defining a molten metal path. The filter has a coating of carbon or carbon in intimate contact with a thermite material on the surface of the filter. A process is disclosed for filtering molten metal which comprises passing molten metal through the above described coated filter.

12 Claims, 3 Drawing Sheets

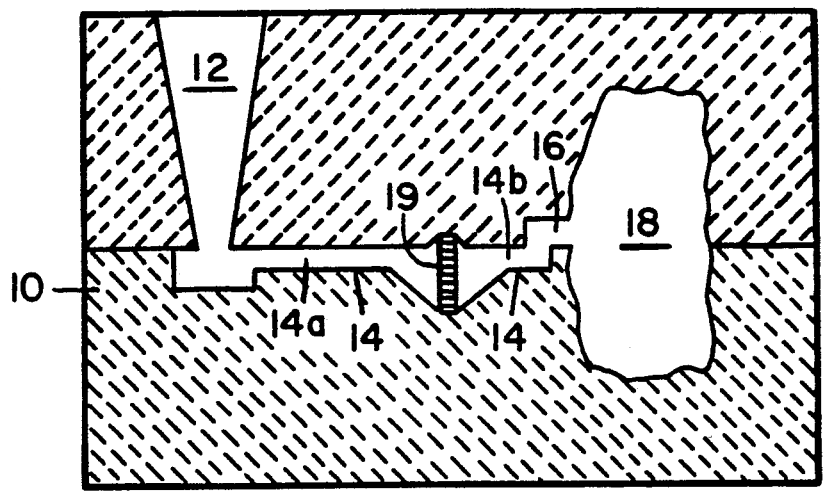
Fig. 1
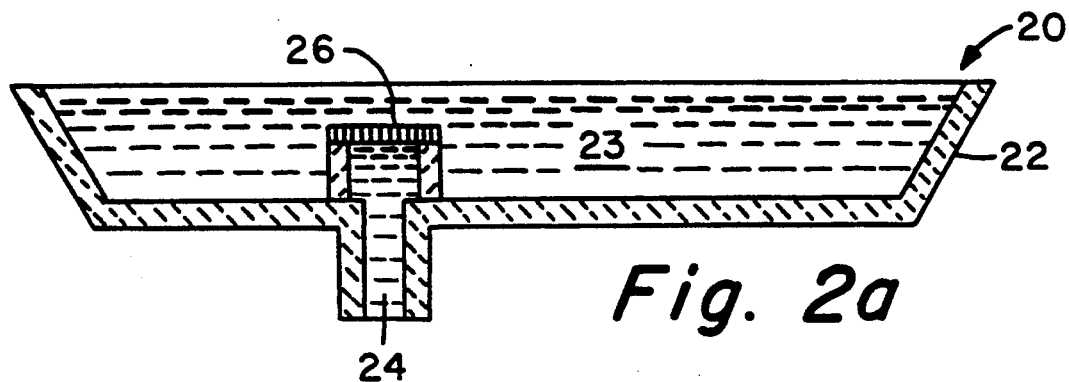
Fig. 2a
Fig. 2b
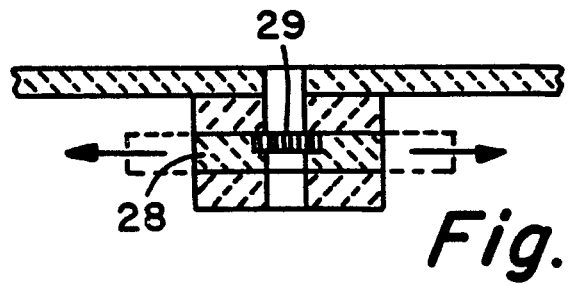
Fig. 2c

COATED MOLTEN METAL FILTERS

BACKGROUND OF THE INVENTION

This invention relates to a molten metal filter having a coating of carbon or carbon and a thermite material on its surfaces. In comparison with uncoated filters, the use of the coating enables metals with lower pouring temperatures to pass through the filter during the filtration operation. The advantages of lower pouring temperatures are economic advantages of less energy usage and better casting quality. Use of carbon with thermite is especially advantageous in lowering the pouring temperature required in filtration. Still more particularly, the coated molten metal filters are used in the molten metal path in assemblies for mold casting and in continuous casting equipment.

As used herein including in the claims, "carbon" means any carbon or carbon-containing material that can be coated on and/or embedded at or in the surface of the structure or body of a molten metal filter and that will readily dissolve in molten metal passing through the filter without releasing any significant amount of gas.

In the processing of molten metals, it had been found advantageous to filter the metal in the liquid state to remove inclusions. To filter metal as a liquid requires a filter with extraordinary properties. The filter must be able to withstand extreme thermal shock, be resistant to chemical corrosion, and be able to withstand mechanical stresses. The present molten metal filter art employs ceramic monoliths, the main components of which are usually sintered silicon carbide, magnesia, zirconia, alumina, and/or silica with modifiers as required.

Generally in the working of molten metals, reduced metals are heated to above their melting points, the level of which is referred to as superheat, and poured into castings either for purposes of storage or for molding into a product. During the pouring operation, prior to the casting, a ceramic filter has been introduced to entrap inclusions out of molten metal. It has been discovered by those knowledgeable in the molten metal casting art that excluding certain contaminants during casting provides solid metals with superior properties at reduced costs.

Certain molten metals, for example super alloys, stainless steels, steel alloys, cast irons, and nonferrous metals are heated to temperatures which test the very limits of the physical and chemical properties of the filter. That these limits are exceeded is evidenced by catastrophic failure of the filter during the pour. During a catastrophic failure the filter breaks into many pieces. The filter may undergo less than catastrophic failure and still be inoperable due to some other failure mechanism. For example, if the mechanical strength of the ceramic material is exceeded the filter can deform in the direction of flow.

Ceramic filters are subject to chemical corrosion. The molten metal slag can, by way of illustration, attack the silicon-oxygen bonds in silica and thereby weaken the structural integrity of the filter. This slag attack or dissolution is a cause of significant failures in filters.

Finally some problems in filtering molten metals can be directly associated with the freezing of the molten metal as it contacts the filter. Since the filter is at temperatures significantly less than the molten metal pour temperature, the initial molten metal which contacts the filter must impart heat to the filter. Since the filter draws heat from the metal, the part of the molten metal affected decreases in temperature which cause the metal to freeze. As the metal solidifies in the filter, the solid metal can block entirely or at least partially the filterability of the filter, or it will slow the rate of filtering in the initial stages of the pour, thus decreasing filter performance.

SUMMARY OF THE INVENTION

In accordance with one aspect of the invention, there is provided a molten metal filter having a carbon or carbon-thermite coating that reduces thermal shock to the filter, and protects the filter from corrosion from the metal or components and impurities in the metal, and prevents metal from freezing in the filter.

In accordance with another aspect of the invention, there is provided a molten metal assembly suitable for casting molten metal which comprises a filter for molten metal and means for molten metal flow passage leading through the filter. The means have surfaces defining a molten metal path. The filter has a coating of carbon or carbon in intimate contact with a thermite material on the surfaces of the filter.

In accordance with still another aspect of the invention, there is provided a process for filtering molten metal which comprises passing molten metal through the above described coated filter.

BRIEF DESCRIPTION OF THE FIGURES

FIG. 1 is a schematic drawing showing a typical mold assembly in which the filter of the present invention is used.

FIGS. 2a, 2b, and 2c are schematic diagrams of parts of continuous casting assemblies showing the positioning of the filter of the present invention.

DETAILED DESCRIPTION OF THE INVENTION

Figure 3:
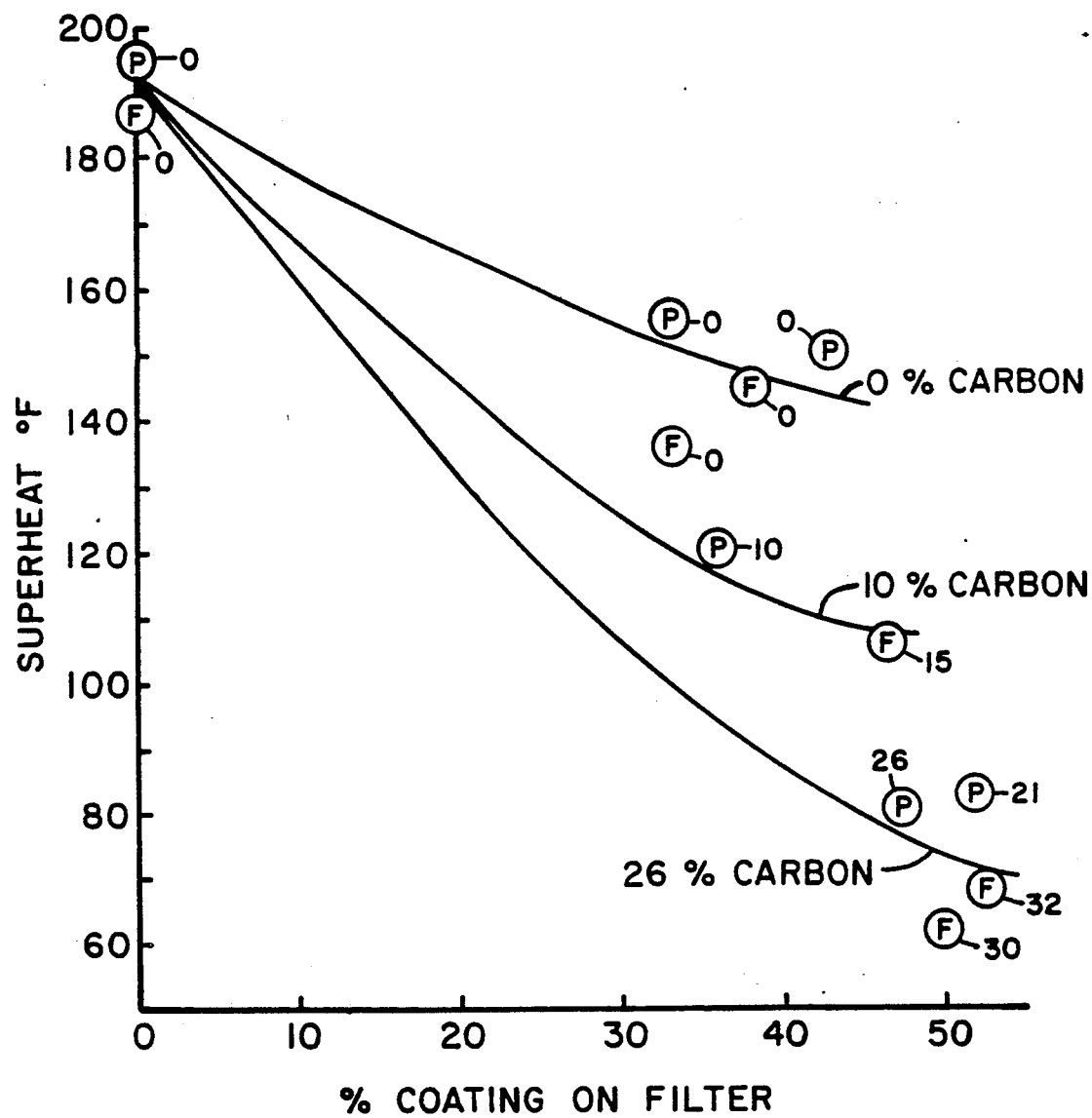
FIG. 3 shows whether molten metal passes through a filter at a given super heat and coating level on the filter for varying levels of carbon in the coating. The carbon is present as a coating over the thermite coating.

The present invention solves many of the aforementioned problems associated with the molten metal filter art. The benefit obtained by use of the invention is that molten metal especially steel at lower pouring temperatures or lower superheats (the difference between the pouring temperature and the solidification temperature) can prime (flow through) the filter without freezing off the flow. Typically an average decrease of 20° F. in the minimum superheat required in the metal is considered a significant improvement. Steel with at least about 190° F. superheat is required to prime uncoated filters. Thermite coated filters containing no carbon require at least about 150° F. superheat in the metal to prime. It has been found that only about 20° F. superheat is required using some mixtures of carbon and thermites as a coating on the filter substrate. This is a decrease of about 130° F. superheat relative to filters not incorporating this invention.

The molten metal that is suited to the practice of the present invention can be any molten metal. However, those which best lend themselves to the practice of the present invention are super alloys, carbon steels, stainless steels, low alloy steels, steel alloys, cast irons, and nonferrous metals, with steels being the most preferred molten metal.

The filters that are to be treated with the carbon or carbon and thermite coating of the present invention can be generally of any type, shape or configuration, the only requirement being that they be suitable for filtering inclusions out of molten metal. For example the filter can be in the form of filter media or be a single unit. However the preferred types are single filter units that can be a foamed structure, a metal or ceramic cellular structure, or a porous-walled honeycomb-shaped structure in which the substrate is made preferably of a ceramic material. The substrate is the type of material of which the filter is made. The overall shape of the filter unit itself can be of any shape depending on the application. It is to be understood that any material can be used as the filter substrate material as long as it can withstand the thermal shock of the molten metal. Some materials that are especially suited to the practice of the present invention are alumina, mullite, zircon, zirconia, spinel, cordierite, lithium aluminosilicates, titania, feldspars, quartz, fused silica, silicon carbide, kaolin clay, aluminum titanate, silicates, aluminates, and mixtures thereof. Some typical filter types and filter substrate materials are alumina honeycomb filters as described in U.S. Pat. No. 4,591,383 and zircon honeycomb filters as described in U.S. Pat. No. 4,681,624. Those patents are herein incorporated by reference. Other types of filters are ceramic foam filters as described in U.S. Pat. No. 4,610,832. A bulletin entitled "Metal Filters" by Corning Incorporated describes some filters that are suited to the practice of the present invention. The filters can have ceramic foam substrates or be pressed parts with holes pressed therein.

In accordance with a preferred embodiment, the filter is of the type described in U.S. Patent application Ser. No. 07/430,719 which is assigned to the same assignee as the present application. That application is herein incorporated by reference as filed. This filter is a porous sintered ceramic material based primarily on having crystalline phases of mullite and corundum (alpha alumina) interspersed with an amorphous alumina-silica based phase with properties that provide a combination of improved strength, creep resistance and dimensional stability at high use temperatures, together with good thermal shock resistance. A particularly beneficial form of the substrate material is a honeycomb or cellular monolith structure. The ceramic material of which this filter substrate is made has a bulk analytical composition, by weight, of about 74% to 80% alumina and the balance being silica optionally with other oxide and/or impurities naturally occurring from the batch materials, and has a phase composition, by weight of about 45% to 75% mullite, about 23% to 45% corundum, about 0% to 8% cristobalite and the balance being substantially about 2% to 10% amorphous alumina-silica based phase. Generally the other oxide and/or impurities do not exceed about 3% by weight. The mullite crystalline phase contains a nonstoichiometric excess of alumina in solid solution that provides that phase with a higher melting temperature than stoichiometric mullite. The other oxide may be any oxide, e.g. magnesia, that forms a solid solution with alumina in the corundum crystalline phase. The impurities are substantially contained in the amorphous phase, which is usually about one-third alumina and about two-thirds silica, although such amorphous phase may vary from about 0% to 40% $Al_2O_3$. The material is generally of blocky and platy crystals interspersed with the amorphous glassy phase. This balanced composition of the material provides the combination of improved properties as described above. A particularly beneficial form of this type of filter is a honeycomb structure with interconnected thin walls of the porous sintered material defining open-ended cells. Such structure can have cell cross-sectional shapes, cell densities per unit of cross-sectional area of the structure, and wall thickness as are generally known in the technology of ceramic honeycomb or cellular monolith structures. Although it is to be understood that the filter can have any convenient geometry, that is cell density and wall thickness, without departing from the scope of the invention, typically the structures have a cell density of about 9 to 400 cells per square inch, a wall thickness of about 0.01 to 0.060. For foundry applications like that shown in FIG. 1, desirably wall thickness is about 0.012 to 0.035 inch and a cell flow length is about 0.25 to 1.0 and preferably about 0.4 to 0.8 inch. For bulk or continuous casting of steel, filter structures desirably have wall thickness of 0.020 to 0.060 inch and cell flow length of about 0.75 to 3.5 inch. The wall thickness of an uncoated filter is very important in molten metal pours to being able to survive initial slag corrosion attach within about 5 to 20 seconds or so of the start of pours. Generally, uncoated wall thickness of about 0.018 inch or more will survive molten steel pours. However, somewhat thinner walls can be used when the filter has a coating to better withstand such slag attack, such as carbon and/or thermite coatings which will be hereinafter described. In filtering molten steel, it is advantageous that the porous sintered material of the honeycomb structure the bulk analytical composition, by weight, of about 76% to 80% alumina, and a phase composition, by weight, of about 60% to 70% mullite, about 23% to 33% corundum, about 0% to 2% cristobalite, and the balance being about 5% to 10% amorphous alumina-silica based phase. In these cases, desired cell densities are about 9 to 100 cells per square inch and desired uncoated wall thicknesses are about 0.018 to 0.035 inch. For filtering molten gray iron, the same structures as described above for steel filtering can be used, but it has been found economically desirable that the porous sintered material of the honeycomb structure have a phase composition, by weight, of about 40% to 65% mullite, about 30% to 45% corundum, about 0% to 8% cristobalite, and the balance being about 5% to 10% amorphous alumina-silica based phase.

In accordance with one embodiment, any of the above described filters has the coating composition of carbon or carbon and thermite material on the surfaces of the substrate. The presence of a thermite with carbon has a synergistic effect of further lowering the superheat over use of carbon alone. The carbon and thermite can be coated on at least a portion of the surfaces that come in contact with molten metal such as the surfaces of the cell walls of the filter. Alternately the carbon or carbon and thermite can be coated on all of the surfaces including on those surfaces surrounding the pores of the substrate materials, that is having the composition incorporated into the porosity of the substrate. The thermite and carbon can be present in several ways. For example, the substrate can have a thermite coating and the carbon is present as a coating over the thermite coating. Alternately, the carbon can be present as a coating on the substrate and the thermite is present as a coating over the carbon coating. Still another aspect is having a coating on the substrate of an intimate mixture of carbon and the thermite, which is referred to as an integrated coating.

The coatings can be applied by techniques well known in the art such as, for example, immersing the filter in a slurry of the carbon or of the thermite components followed by drying. Alternately, the coating can be applied in the dry form.

In general, any type of carbon can be used that will coat the substrate surface and will not release any significant amount of gas while dissolving in molten metal contacting it. Some types of carbon are coal, lignite, gilsonite, synthetic or natural graphite, diamond, petroleum coke, metallurgical coke, coal tar, petroleum pitch, pyrolytic carbon, CVD carbon, pyrocarbon, polymeric carbon, vitreous carbon, or glassy carbon, activated carbon, charcoal, char, carbon black, lamp black carbon, pitch, coke, anthracite, channel black, and acetylene black. The most preferred of these are graphites, activated carbon, and carbon blacks. Other carbon compounds or materials containing substantial amounts of carbon can also be used, such as carbides, cyanides and carbon-metal alloys. Carbides of Al, B, Ca, Cr, Fe, Mn, Mo, Ni, Si, Ti, V, W and Zr are considered the best of carbides, although carbides of Ba, Be, Hf, Nb, Pu, Ta, Th and U are believed to be suitable. Cyanides of K and Na and alloys of carbon with Al, Fe and Ni are considered good choices in their respective category.

Thermites are well known in the art. Thermites are a reactive chemical species. The first type of reactive species react due to catalysis or an initiating heat treatment or heat communication that stimulates an exothermic reaction. The second type of reactive species react due to catalysis or an initiating heat treatment or heat communication that stimulates an inorganic oxidation-reduction reaction. The third type of reactive species react due to catalysis or an initiating heat treatment or heat communication that stimulates an exothermic reaction that can be an inorganic oxidation-reduction reaction. Thermite coatings are described in copending application Ser. No. 07/241,581, U.S. Pat. No. 5,022,991, which is to the same assignee as the present application. That application is herein incorporated by reference as filed.

The first type of thermite is that which avails itself of the thermodynamic relationship generally found in species which, when sufficiently encouraged either through catalysis or through the addition of an initial energy grant or heat communication to the reactants, completes the reaction to products whereby the process of reaction generates heat and warms its environment. This class of reaction is generally known, by those skilled in the art, to have an overall negative free energy of reaction. An example of such a reaction is the interaction between $ZrC + VN$ to give $ZrN + VC$ and heat.

These kinds of reactions can also be characterized by their enthalpies of reaction, a significant property related to the free energy. The individual enthalpies of reactants in a reaction may be a major factor in interactions wherein, the net enthalpies available are near or at 0° Kcal/mole at the pour temperature. These reactions may provide valuable benefits to the filter, even though the net enthalpy of the reaction may not be negative. An example of such a reaction is the interaction between $MgO + SiO_2$ to give $MgSiO_3$.

The second type of thermite employs the dynamic of an oxidation-reduction reaction or redox couple reaction. Similar to the first embodiment where no redox couple is required, the redox couple of this type of thermite such as aluminum, titania, and aluminum nitride which are mixed to yield titanium nitride and alumina, is applied to the surface of a filter such as a ceramic filter as a coating or as a part thereof.

Generally the preferred redox couple releases heat, that is, the redox reaction is exothermic. This third type of thermite material is the combination in which the redox reaction in the thermodynamics sense, has negative free energy and negative enthalpy heat of reaction. The benefits that result and the mechanism of reaction is analogous to that described above for the first and second types of thermites. An exothermic reaction capably donates heat to the metal so that the metal does not freeze in the filter. Additionally, an exothermic reaction donates heat to the filter thereby requiring less heat flow from the metal to bring the filter to molten metal temperatures. This phase of the thermite reaction is known as filter priming. An example of this type of thermite is iron oxide and aluminum which react to form alumina and iron metal with the generation of a significant amount of heat.

Upon completion of the filter priming reaction, the thermite coating reaction, whether by the redox or heat of reaction mechanism, the product of the reaction remains as a layer on the filter. The product may be an oxidized form or simply a more stable compound of the reactants, which may provide chemical durability to the filter. The durability is manifested as a physical barrier or sacrificial layer on the filter which provides protection against slag attack. The particular reaction chosen as the coating may depend on the composition of the inclusions in the molten metal which is to be filtered out of the molten metal, the type of molten metal to be filtered, the filter substrate composition, the exothermic heat of reaction of the coating, the priming temperatures required, the slag chemistry, ladle refractories, or combinations thereof. It is well known to those in the art that physical and chemical compatibilities of the inclusion and filter lead to more efficient filtering. For instance, if alumina inclusions are predominant in the slag, a most efficient surface for filtering is an alumina coating. By matching chemistries, alumina in this instance, the inclusions tend to become highly associated with the filter, thereby becoming filtered from the molten metal.

Advantageously, tailoring the coating to the slag properties provides the freedom to design the filter substrate out of materials that can withstand the temperatures experienced in the molten metal environment. For example, filter substrates high in alumina or silica, such as mullite, cannot normally withstand attack by a slag with a high calcia content. The various protective mechanisms provided by the thermite coating on a mullite substrate allow use of the substrate where, heretofore, the same substrate would have experienced catastrophic failure.

The invention is additionally embodied in a redox and/or exothermic reaction wherein the coating, rather than reacting with a component within the coating, reacts with a filterable molten metal. In this instance, the reactive metal source in the molten metal reacts with the oxidized species in the coating. For example, tin oxide plus iron will oxidize the iron in molten steel. Similarly, dissolved silicon, manganese, and aluminum constituents of steel can reduce other oxides, exothermically, to effect the advantages of the invention. A particular advantage of this embodiment is that refractory metals do not have to be added to the coating, thus decreasing coating slurry instability. Associated disadvantages may e obtained due to loss of compositional control and undesirable by-products.

The invention is also embodied in a reaction of the coating with the substrate. In this particular embodiment, an oxidized reactant is available in the substrate to react with the coating, which includes the metal reductant. Less stable oxides in the filter, such as silica, chromia, and titania, can be reduced by aggressive reductants such as zirconium and aluminum. Dissolved oxygen, sulfur, and phosphorus, which may be present in the molten metal, are also available to react with the reactive metal.

The combination of carbon and thermite serves to enhance the available heat for the filter over the heat provided by the thermite without carbon. The exact mechanism for the increased heat is not known. It is possible that the carbon enhances the thermite reaction, or the carbon dissolves in the molten metal thereby decreasing the liquidus temperature of the metal. The combination of carbon and thermite is especially effective in providing increased heat in filtering (filter priming) and casting of molten metal.

It is believed that any reaction which can be initiated by the molten metal pour will be advantageous as a thermite coating. This includes any of the transition and/or rare earth metal reactants. Generally the, following reaction is obtained:

$$M_xL_x + yR + R_yL_z + xM$$

where x may or may not be equal to y, or x and y may or may not equal z, and L is some anion. Additional oxidized metals may be added to the reactant side of the equation to introduce redox couple for multiple redox reactions.

Potential metal reactants may be derived from lithium, mercury, palladium, silver, copper, lead, cadmium, cobalt, nickel, molybdenum, tin, iron, tungsten, vanadium, potassium, zinc, niobium, and chromium. These metals, designated as M in the above equation, may be present as some oxidized species, such as oxide, carbide, nitride, halide, phosphide, boride, aluminides, silicides, nitrates, sulfates, phosphates, carbonates, or some organic anion, such as oxylates, succinates, and chelates, to react with another metal to produce an exothermic, redox or some combination reaction.

The families of and some representative metals, designated as R in the above equation, contemplated within the present invention comprise metals in Groups IIA, IIIA, IVA, IB, IIB, IIIB including the rare earth metals, IVB, VB, VIB, VIIB and VIII as shown in the Periodic Table of the Elements in the Handbook of Chemistry and Physics, 46th Edition published by the Chemical Rubber Co. More specifically the following metals can be very usefully employed for purposes of the present invention yttrium, manganese, tantalum, vanadium, silicon, titanium, zirconium, aluminum, uranium, barium, magnesium, beryllium, thorium, and calcium.

The thermite can have additions that aid the thermite reaction. These include igniters (oxidants) like nitrates, manganates, chromates, and manganese oxides and fluxes such as fluorides, chlorides, and iodides.

A most preferred redox couple is $Fe_2O_3$ and Al (as contained in a 50/50 Fe/Al alloy). This reaction provides a suitable priming reaction, generates a durable protective coating and aids in filtering impurities in the melt.

Combinations of the above species may be engineered to effect the advantageous results of the invention. One skilled in the art can mix a combination of reactants to self-react in the coating, react with the molten metal, and react with filter substrate to produce the exothermic, redox, and/or combination reactions resulting in the above cited benefits. Combinations of chemical species therebetween and thereof may be effected with similar results.

It has also been found advantageous to add diluents to the thermite reaction. The addition of diluents may slow the reaction rate of thermite reactions thus avoiding localized melting of the filter. The diluent may be an inert material that absorbs heat from the exothermic reaction. A larger amount of heat can be extracted if the diluent melts at temperatures less than the adiabatic flame temperature of the thermite. An additional diluent benefit may be realized if a diluent is chosen that sinters onto the filter during the exothermic reaction. This results in an additional protective barrier. Alumina is the most preferred diluent. Other diluents are titania, chromia, and zirconia, all exhibit strong resistance to slag attack.

The amount of coating on the filter can vary according to the type of filter, the application, the manner in which the coating is applied, on the type of thermite, the type of molten metal etc. In the case of the carbon-thermite integrated coating, the amount of coating depends also on the level of carbon in the carbon-thermite combination. With higher amounts of carbon, less total coating is required to lower the superheat a given amount.

In accordance with a preferred embodiment, the filter has a porous honeycomb shaped substrate. The preferred type of thermite material is the aforementioned redox couple $Fe_2O_3$ and Al with the Al being supplied in the form of an alloy of about 50% by weight Fe and the balance Al. The Fe metal is unreactive in this composition but is considered part of the thermite material. The preferred type of carbon is graphite. It is preferred to apply the carbon-thermite as a single integrated coating. In accordance with this embodiment, the level of carbon relative to the carbon-thermite coating material is normally at least about 10% by weight, and preferably at least about 15% by weight and most preferably from about 20% to about 40% by weight. The percent of carbon relative to coating material is measured by the formula:

$$\% \text{ Carbon in total coating} = \frac{\text{weight of carbon}}{\text{weight of thermite} + \text{weight of carbon}} \times 100.$$

In this instance, the level of coating relative to the filter is at least about 5% by weight, preferably at least about 15% by weight and most preferably about 25% to about 40% by weight. The level of carbon-thermite coating relative to the bare filter is measured by the formula:

$$\% \text{ coating} = \frac{\text{weight of thermite} + \text{weight of carbon}}{\text{weight of bare filter}} \times 100.$$

With the above described filter and thermite material, when the carbon and thermite are applied as a coating of carbon over a coating of thermite material, the amounts of carbon relative to the coating that are normally present are at least about 5% by weight, preferably at least about 10% by weight and most preferably from about 14% to about 85% by weight. In this instance, the level of coating relative to the filter is from about 5% to about 70% by weight.

Although the above relative amounts of thermite and carbon are given for one specific type of filter, it is to be understood that relative amounts of carbon and thermite relative to the filter can vary as mentioned earlier.

When a surface having carbon or carbon and a thermite material come in contact with molten metal the heat produced by the reaction of the thermite and/or carbon allows metal to be poured with a lower superheat to maintain the metal in the molten state without freezing. Presence of carbon enhances the suppression of the superheat, although the exact mechanism is not known. The particular thermite that is used depends on the nature of the filter substrate material and on the molten metal that is to be filtered. Some of the preferred systems are given in the examples that ensue.

The filter of the present invention can be used in essentially any application in which molten metal is filtered. Some typical applications are in molten metal casting into molds and in continuous casting. An example of the former type is shown in FIG. 1 in which are shown the casting assembly (10) which is composed of sprue, (12), runner (14), ingate (16) and mold cavity (18). The sprue, runner, and ingate form the molten metal path through which the molten metal passes from the source of the molten metal (not shown) to the mold into which it is cast. The filter (19) of the present invention can be placed at essentially any convenient point in the molten metal path. In FIG. 1 the placement of the filter is in the runner system between the sprue and ingate splitting the runner into forerunner (14A) and after runner (14B). FIG. 2a shows an assembly (20) for continuous casting of molten metal which is made up of tundish (22) into which molten metal (23) is poured, and discharge tube (24) through which the molten metal passes from the tundish. The discharge tube can include slide gates (not shown). From the discharge tube molten metal passes into a continuous casting machine. The filter of the present invention is shown in a polygon arrangement (26) at the point where molten metal passes from the tundish into the discharge tube. As has been discussed previously, the filter can have any convenient shape and be place anywhere in the molten metal path, depending the particular geometry of the molten metal processing system or on the specific application. FIG. 2b shows a variation of the continuous casting arrangement of FIG. 2a in which the filter is placed in the tundish as a dam. Metal flows in the direction of the arrow through the filter. The discharge tube is shown with slide gate (28) in FIG. 2c. The filter for this variation (29) is placed in the discharge tube.

To more fully illustrate this invention, the following non-limiting examples are presented.

EXAMPLE 1

Thermite is prepared by milling $Fe_2O_3$, Fe/Al powder (50% by weight Fe and 50% by weight Al), silicone resin and isopropyl alcohol (IPA) for about 1 hour to disperse and mix the ingredients and form a slurry. Fired filters (mullite-alumina with 100 cells/in.$^2$, square 0.080 openings, and 0.020" webs) are dipped into the slurry to apply the thermite coating, and then dried. The resulting thermite coated filter is redipped as many times as necessary in a slurry of carbon and sodium silicate in water and isopropyl alcohol in a similar manner to get the carbon on the thermite at the desired level. The carbon is supplied as Dylon AA graphite available from Dylon Industries. The sodium silicate-water and isopropyl alcohol serve as binder and carrier respectively. The filters have a thermite coating of about 35% to about 40% by weight loading level on the filter (loading level=(wt. thermite / wt. of uncoated filter)×100). The filters are used in the mold assembly type shown in FIG. 1. FIG. 3 shows the flowability when molten carbon steel is passed through a filter having the given level of total coating on the filter for varying levels of carbon in the total coating. (The carbon coating and thermite coatings make up the total coating.) The lines indicate the points above which the molten metal passes through the filter and below which the molten metal freezes or fails to completely pass through the filter for a given level of carbon. Some specific conditions are given as indicated by P for passing through the filter and F for failure of the molten metal to pass through. The numbers next to the P or F are the actual percents of carbon in the total coating. The carbon is present as a coating over the thermite coating. As shown in FIG. 3, filters with about 35% loading of only thermite (0% carbon) require at least about 150° F superheat to prime. When a carbon coating is added to the filter on top of a thermite, such that the total coating level is about 50%, and the coating bulk composition is about 26% carbon, the required superheat decreases to about 70°-80° F. The above numerical values apply to a specific mold assembly. It is to be understood that the exact numerical values can vary depending on the specific measurements and geometry of the mold assembly and filter, the type of molten metal and the type of thermite. However, the trends shown in FIG. 3 are the same.

EXAMPLE 2

Figure 4:
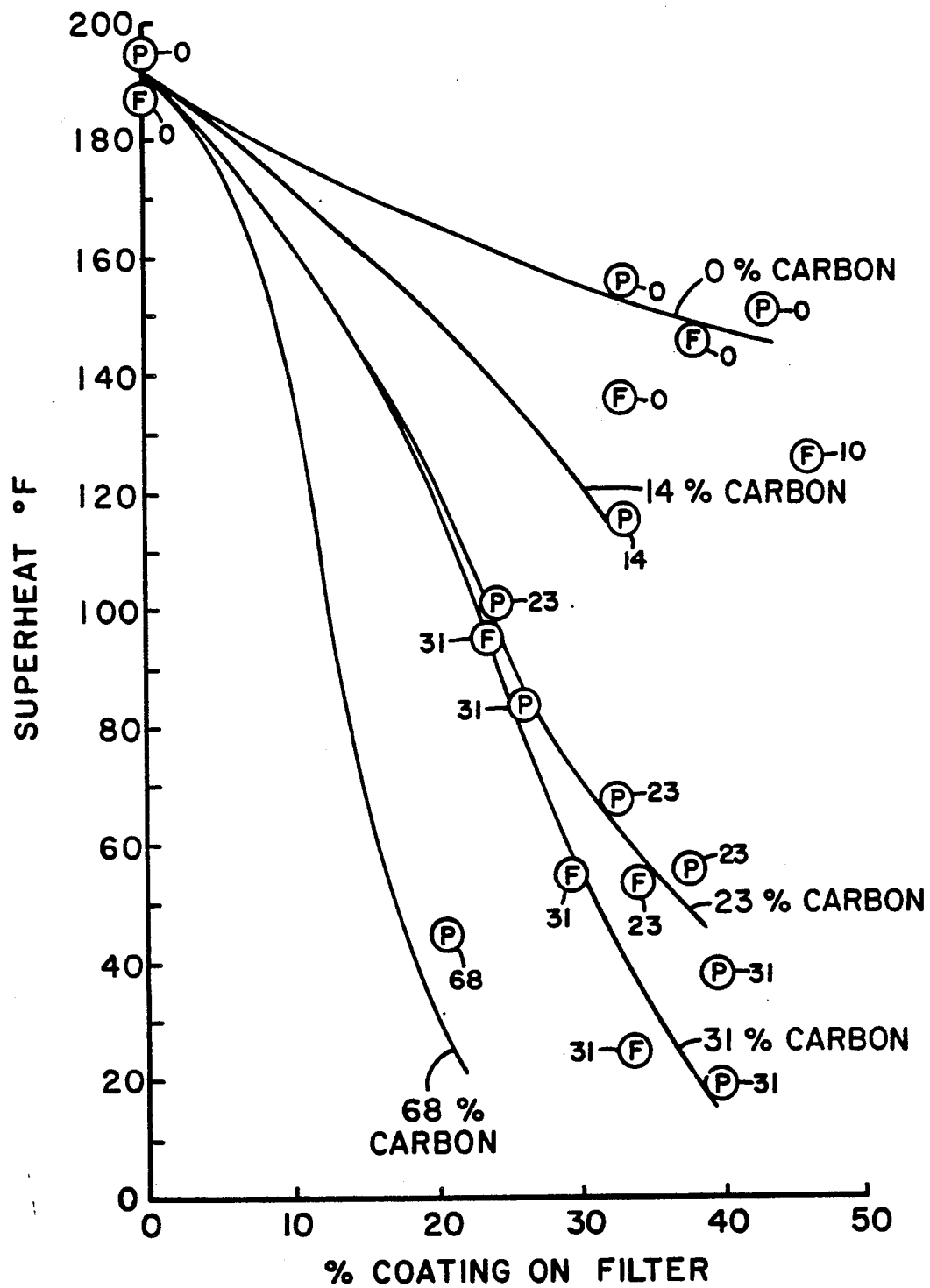
FIG. 4 shows whether molten metal passes through a filter at a given super heat and coating level on the filter for varying levels of carbon in the coating. The carbon and thermite are present as an integrated coating on the filter.

Iron oxide, Fe/Al 50/50 powdered alloy, natural graphite, and methyl isobutyl ketone-cellulose are milled to form a slurry. Fired filters of the same type as in Example 1 are dipped in the slurry and dried as in Example 1 to form an integral coating of carbon and thermite on the filter. FIG. 4 shows the flowability results of the molten metal through the filter. The designations are the same as described for FIG. 3. The results indicate that the required superheat decreases as the level of carbon increases at given coating levels.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A molten filter having a coating of carbon in intimate contact with a thermite material on the surfaces of said filter.

2. A molten metal filter of claim 1 wherein said coating is present on said filter in the form of a coating of said carbon over a coating of said thermite material.

3. A molten metal filter of claim 1 wherein said coating is present on said filter in the form of a coating of said thermite over a coating of said carbon.

4. A molten metal filter of claim 1 wherein said coating is present on said filter in the form of a single coating of a mixture of said carbon and said thermite.

5. A molten metal filter of claim 1 wherein the structure of said filter is a foamed structure.

6. A molten metal filter of claim 1 wherein the structure of said filter is a cellular structure wherein the substrate of said filter is made of material selected from the group consisting of ceramic materials, metals, and combinations thereof.

7. A molten metal filter of claim 1 wherein the structure of said filter is porous walled honeycomb shaped.

8. A molten metal filter of claim 7 wherein the substrate of said filter is made of ceramic material.

9. An assembly suitable for casting molten metal, said assembly comprising a filter for molten metal and means for molten metal flow passage leading through said filter, said means having surfaces defining a molten metal path, and said filter having a coating of carbon in intimate contact with a thermite material on the surfaces of said filter.

10. An assembly of claim 9 wherein said assembly is a mold assembly having one or more mold cavities into which said molten metal flow path leads and into which said molten metal is cast.

11. A process for filtering molten metal, said process comprising passing said molten metal through the filter of claim 1.

12. A process of claim 11 wherein said molten metal is steel.

* * * * *

UNITED STATES PATENT AND TRADEMARK OFFICE
CERTIFICATE OF CORRECTION

PATENT NO. : 5,104,540
DATED : April 14, 1992
INVENTOR(S) : John P. Day, Timothy V. Johnson, Ronald D. Quinn It is certified that error appears in the above-identified patent and that said Letters Patent is hereby corrected as shown below:

ON THE TITLE PAGE:

In Abstract, line 12, -- surface --
should read -- surfaces --.

Column 5, line 47, after -- is --
should read -- assigned --.

Column 7, line 8, -- e -- should
read -- be --.

Column 11, Claim 1, line 1, after
-- molten -- should read -- metal --.

Signed and Sealed this

Twentieth Day of July, 1993

Attest:

MICHAEL K. KIRK

*Attesting Officer*     *Acting Commissioner of Patents and Trademarks*